Oct. 23, 1951  R. GINELL ET AL  2,572,719
PLASTIC ARTICLE AND METHOD OF TREATMENT
Filed Nov. 4, 1947

INVENTOR
Robert Ginell
Anny Margot Ginell
BY
Norman H. Holland
ATTORNEY

Patented Oct. 23, 1951

2,572,719

UNITED STATES PATENT OFFICE 2,572,719

PLASTIC ARTICLE AND METHOD OF TREATMENT

Robert Ginell and Anny Margot Ginell, Jersey City, N. J.

Application November 4, 1947, Serial No. 783,866

9 Claims. (Cl. 41—41)

This invention relates to surface effects on plastics and particularly the development of desired marking or decoration by treatment of the surface of a soluble plastic material.

The object of the invention is to provide on the surface of such material a marking or decoration which will be permanent in character and uniform in texture and attractive in appearance.

Figure 1:
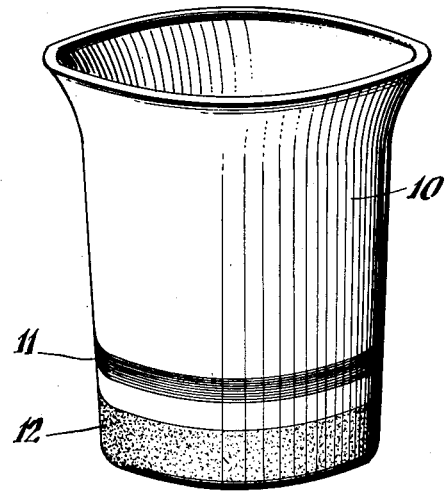
Figure 2:
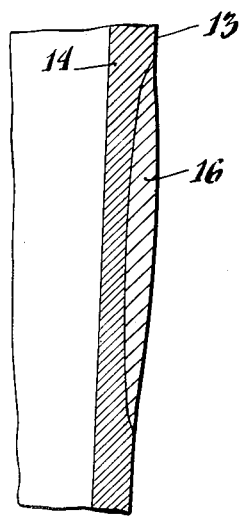
Figure 3:
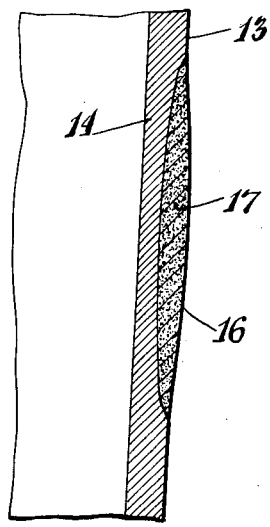

Further objects of the invention, particularly in providing a practical controllable method for producing such surface effects in desired translucency, opacity and coloring, will appear from the following description taken in connection with the accompanying drawings, in which Fig. 1 is a perspecive view of a plastic drinking cup decorated according to this invention;

Fig. 2 is a section of a plastic surface having superimposed a solution according to this invention; and Fig. 3 is the same as Fig. 2 during the precipitation step.

We have found that a variety of pleasing surface effects may be developed in soluble plastic material by treatment with a softening solvent followed by subsequent application of a precipitating agent acting, for instance, to render transparent material translucent or opaque without the addition of any opacifying material. A desired coloring of the treated areas may be simultaneously attained by incorporating a dye or the like in the solvent or precipitant.

With reference to Fig. 1, a drinking cup 10 is shown having encircling treated areas forming, in the manner of this invention, bands 11 and 12. In Fig. 2 a surface 13 of a plastic material 14 is shown treated with a solvent of the plastic material to form a solution or swelling 16 which contains material dissolved from the plastic surface 13 without chemical action that alters the plastic such as hydrolysis or degradation. In Fig. 3 the solution 16 is shown containing the dissolved plastic material in precipitated form 17 depositing on the surface 13. The precipitate 17 is formed by adding to the solution 16 a reagent in which the plastic material acted upon is relatively insoluble and which reagent, therefore, acts as a dilutent of the solvent in the solution 16 and causes the plastic material to precipitate out of the weakened solvent.

The term "precipitate" as used herein is that formed within the body of the treated material by chemical precipitation, namely the deposit of an insoluble substance from a solution after the addition of a precipitating agent.

As a specific example of this process, the surface of methyl methacrylate may be treated to present a desired decorative effect. The acrylic polymer resin methyl methacrylate is the methyl ester of methacrylic acid and is particularly useful in its transparent form. Marking on the surface of a finished piece of methyl methacrylate may be accomplished according to this invention simply by treating the area to be altered with a solvent of methyl methacrylate which will react with the surface material to provide a solution or swelling containing the dissolved but unaltered methyl methacrylate. To obtain the desired finish a reagent is added to this solution in which the dissolved methyl methacrylate is only slightly soluble. The addition of this reagent dilutes the solvent of the methyl methacrylate in the solution and causes the precipitation of the dissolved methyl methacrylate out of the solution and onto the surface of the plastic material. The treated area is subsequently dried to remove the solution and leave the treated area of the plastic with an etched or frosted surface which may be translucent or opaque depending upon the extent to which the action is carried, the solvent used and quantity of precipitate obtained. This treated surface will be whitish in color if pure untinted methyl methacrylate is used but may be given a desired color by use of a dye to provide the desired shade. The dye may be added either to the solvent or to the precipitating agent and should be sufficiently insoluble in the solution on the surface of the treated article at the moment of precipitation to be occluded by the precipitating methyl methacrylate and thus become incorporated in the finished surface. For example, basic fuchsine is a suitable dye for imparting a red coloring to the surfacing or untinted methyl methacrylate when methyl alcohol is used as a precipitant. The coloring may be soluble in either the solvent or the precipitant but must be insoluble in one or the other of them so that it is insoluble in the solution 16 on the surface of the treated material at the time that the precipitate of the plastic material is brought down. Upon mixing with the reagent in which it is insoluble the coloring precipitates and deposits on the surface of the treated material. The precipitated coloring that does settle on the surface is occluded by the precipitated plastic and deposits on the surface with the plastic precipitate.

For the purpose of affording a clearer understanding of the invention, the treatment of methyl methacrylate is shown with ethylene dichloride and methyl alcohol. The methyl methacrylate is treated over the areas which it is desired to transform with ethylene dichloride at room temperature until the surface treated softens upon the formation of a solution of the methyl methacrylate in the ethylene dichloride solvent. The plastic material thus treated is then immersed in a methyl alcohol bath which acts upon the solution areas to precipitate the methyl methacrylate from its solution with the ethylene dichloride and fix the precipitating methyl methacrylate on the surface of the methyl methacrylate body throughout the treated areas. After a few minutes in this bath the methyl methacrylate body is removed and dried with or without a water rinse in air or in an oven. The treated area may be colored if desired, by a dye such as basic fuchsine. Otherwise, the treated portions are white varying from translucent to opaque to the passage of light as determined by the length of the time of treatment, the speed of the action and the concentration of the solvent and the precipitating agent.

The thermoplastic resin prepared from styrene and known as polystyrene may also be surface treated by this process to produce a surface effect that is colored, frosted or opaque as may be desired. This process as applied to polystyrene involves the preparation on the surface of the plastic material of a solution containing polystyrene as outlined above in connection with methyl methacrylate. The production of the altered surface is followed through step by step essentially the same as outlined in the case of the methyl methacrylate. For the purpose of example, the treatment of polystyrene is described with methyl ethyl ketone as the solvent and methyl alcohol as the precipitant. The methyl ethyl ketone is applied to the area of the polystyrene which it is desired to alter producing a solution containing some of the polystyrene. The treated polystyrene material is then dipped in a bath of methyl alcohol at room temperature for a sufficient time to precipitate from the solution the dissolved polystyrene which depositing on the surface of the plastic material throughout the treated area provides an altered surface which renders the treated area different from the original surface. Here again, as in the case of the methyl methacrylate, the surface may be only slightly roughened to render it translucent or it may be so affected as to make the surface opaque. Similarly coloring matter may also be incorporated in the solution to provide tinting to the precipitate and consequently to the treated area.

A further example of a soluble plastic material susceptible to treatment according to this process is the vinylite copolymer, vinyl chloride-vinyl acetate. For the purpose of example, the vinylite copolymer may be described as treated with methyl ethyl ketone as a solvent and methyl alcohol or water-methyl alcohol mixture as a precipitant. This treatment is carried forward in the same manner as described above in connection with the methyl methacrylate and polystyrene to provide a treated surface on the vinylite copolymer.

Cellulose acetate may likewise be treated by a solvent and precipitating agent to provide an altered surface area of varying degrees and color. As an example of a solvent and precipitating agent for treating cellulose acetate, methyl ethyl ketone provides a solution on the treated areas of cellulose acetate similar to those described above and the petroleum ether will act as a precipitating agent to deposit the cellulose acetate out of the solution and upon drying provide the treated area with the desired result. Some of the polyamides, known as nylon compounds, are soluble in alcohol; others of these nylon polyamides are soluble in formic acid. These nylon polyamides may be treated in the manner of this invention by the treatment with their solvents followed by precipitation by water or a water and methyl alcohol mixture.

The coloring material may be added to the solution either before the precipitating agent or with the precipitating agent. The coloring is then in the precipitate when it deposits on the surface of the plastic material and becomes fast when the treated area has dried and the precipitating plastic has set. Washing the treated area and the precipitate varies the intensity of the coloring. The intensest colors are obtained by allowing the plastic surface to dry before washing and then washing with a suitable liquid, such as water, after the surface has dried. By washing the treated and colored area before it dries with a liquid in which the dye is soluble the coloring in the treated area will be made paler. A control of the shade may be obtained by the degree of drying before washing, varying from the palest shades produced by washing immediately after precipitation to the intensest shades resulting from complete drying before washing. The degree of dullness of the treated surface may also be varied by the degree of drying, varying from the dullest surface obtained by immediate washing to a semi-dull surface obtained by washing after complete drying.

The surface after the precipitation and drying will vary from matte to semi-matte. To obtain a glossier or smoother surface the article may be treated with a solvent to slightly dissolve the uppermost layer of the altered surface. When this surface dries it will be smoother and therefore glossier. The solvent used may be the same as previously used to dissolve the plastic or a less effective solvent may be employed. The coloring deposited with the precipitated plastic may be soluble or insoluble in the solvent of this surfacing step depending upon the effect desired. If it is desired to maintain the intensity of the color then the solvent selected must not dissolve the coloring material which if insoluble will not be affected by the solvent and will merely be covered over by a surface of plastic material after the surfacing step. The effect obtained by this process is pleasing as the coloring being submerged below the surface of the plastic material serves to provide an ingrained color effect to the article. On the other hand, if it is desired to reduce the intensity of the coloring a solvent which dissolves the coloring may be used on the surface of the plastic. The treatment is then carried on only long enough to obtain the shade of the coloring desired at which point the treated article is dried to provide a glossy surface with the coloring in the surface and somewhat modified by its solution in the treating solvent. This surfacing treatment with a coloring dissolving solvent may be modified by spraying the treated surface with the solvent rather than dipping the treated article in a bath of the solvent. With the spraying method the modification of the color by dissolution in the solvent is slower.

The solvent may be applied to the treated area by various methods adaptable to the plastics treated and with the effects desired. Examples of the methods that can be used for producing the dissolved areas on the surface of treated plastic material include masking the surface to be untreated with a masking tape whose gum is insoluble in the solvent and then subsequently dipping the plastic body in the solvent bath and then in the precipitating bath. Another method is masking the untreated areas and spraying the treated plastic material. In this case it would be advantageous to use thickening agents with the solvent. Plastic surfaces could also be printed with the solvent followed by a bath treatment in a precipitating agent. In this case also it would be advantageous to use thickening agents with the solvent. A suitable thickening agent may be the plastic material of which the body is made.

This process may be readily adapted to other soluble plastics upon which a surface solution can be prepared and the plastic material subsequently precipitated out of solution by treatment with a reagent in which the treated plastic material is insoluble. The surface areas so treated may be given a variety of finishes depending upon the extent to which the process is carried. Coloring material may be added either with the solvent or with the precipitating agent to provide a variety of effects as desired. While the foregoing has described in some detail the preferred embodiments of this invention, it will be understood that this is only for the purpose of making the invention more clear and is not to be regarded as limited to the details described. On the other hand, the invention is to be regarded as limited only by the terms of the accompanying claims.

Having thus described our invention, we claim:

1. A process for the treatment of the surface of a soluble plastic material which comprises applying a solvent to a predetermined surface area, subjecting the plastic material to the action of the solvent for a time sufficient to produce a solution of treated material penetrating to desired depth at said area, subsequently applying a precipitating agent in liquid form to said solution and permitting said agent to penetrate said solution to said desired depth and precipitating the plastic material as a precipitate in said solution of the treated material below the surface thereof and then evaporating said solvent to leave said precipitate within said material to effect a corresponding modification of the appearance of said surface area.

2. A process for the treatment of the surface of a soluble plastic material which comprises applying a solvent to a predetermined surface area, subjecting the plastic material to the action of the solvent for a time sufficient to produce a solution of treated material penetrating to desired depth at said area, subsequently applying a coloring agent and a precipitating material in liquid form to said solution and permitting said precipitating material to penetrate said solution to the said desired depth and precipitating the plastic material as a precipitate with the coloring agent in said solution of the treated material below the surface thereof and then evaporating said solvent to leave said precipitate within said material to effect a corresponding modification of the appearance of said surface area.

3. In a process as described in claim 2 applying a solvent of the plastic material to the treated material for a time sufficient to effect a softening of the surface of the plastic material and thereafter hardening the softened area to provide a glazed surface over the coloring agent.

4. A process as described in claim 2 including a plastic material thickening agent in said solvent.

5. A process for the treatment of the surface of a soluble plastic material which comprises applying a solvent containing a coloring agent to a predetermined surface area, subjecting the plastic material to the action of the solvent for a time sufficient to produce a treated material penetrating to desired depth at said area, subsequently applying a precipitating agent in liquid form to said solution permitting said agent to penetrate said solution to the desired depth and precipitating the plastic material as a precipitate with the coloring agent in said solution of the treated material below the surface thereof and then evaporating said solvent to leave said precipitate within said material to effect corresponding modification of the appearance of said surface area.

6. In a process as described in claim 5, applying a solvent of the plastic material to the treated material for a time sufficient to effect a softening of the surface of the plastic material and thereafter hardening the softened area to provide a glazed surface over the coloring agent.

7. In a process as described in claim 5, washing said modified surface area with a color-removing liquid to control the intensity of the coloring agent.

8. A process for the treatment of the surface of a soluble plastic material which comprises applying a solvent to a predetermined surface area, subjecting the plastic material to the action of the solvent for a time sufficient to produce a solution of treated material at said area, subsequently applying a precipitating agent in liquid form and a coloring agent to said solution permitting said agent to penetrate said solution to the desired depth, precipitating the plastic material as a precipitate with the coloring agent in said solution of the treated material and washing the treated area with a color-removing liquid to control the intensity of the coloring agent in the precipitated plastic material to effect a corresponding modification of the appearance of said surface area.

9. A unitary body of soluble plastic material produced by the process of claim 8 and consisting of an unmodified portion and another solvent-modified portion having an outer exposed surface and an inner area merging integrally with the material of said unmodified portion, and particles of a precipitate of said plastic material embedded in said modified portion and distributed therein throughout the material between the said outer surface and inner area thereof.

ROBERT GINELL.
ANNY MARGOT GINELL.

REFERENCES CITED

The following references are of record in the file of this patent:

UNITED STATES PATENTS

| Number | Name | Date |
| --- | --- | --- |
| 2,281,837 | Ford | May 5, 1942 |
| 2,304,632 | Faelten | Dec. 8, 1942 |
| 2,314,975 | Ford | Mar. 30, 1943 |